Sept. 1, 1931.                    C. H. GAGEN                    1,821,211
               DOUBLE PASSAGE FILTER AND CLOSURE FOR THE SAME
                       Filed June 20, 1928        3 Sheets-Sheet 1
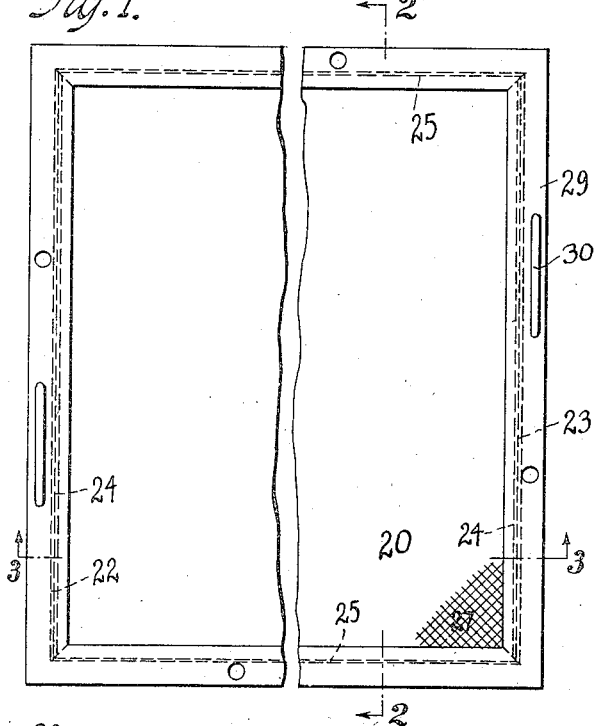
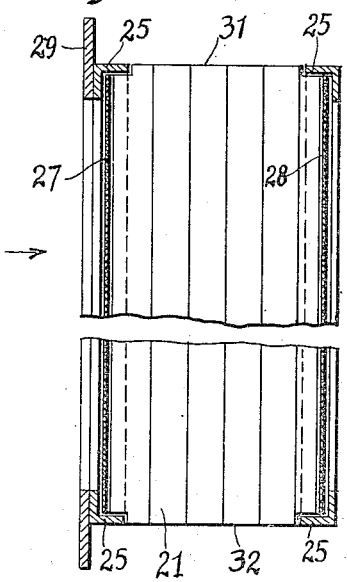
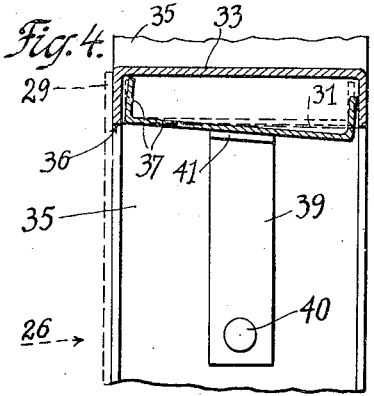
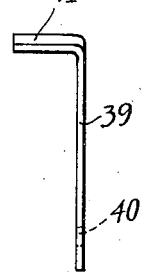
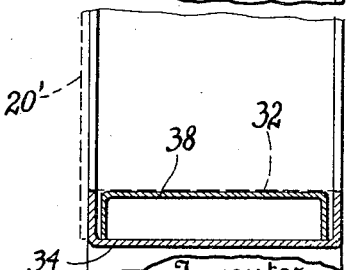
Inventor:
CHARLES H. GAGEN,
By his Attorney Julian J. Wittal Sept. 1, 1931. C. H. GAGEN 1,821,211
DOUBLE PASSAGE FILTER AND CLOSURE FOR THE SAME
Filed June 20, 1928   3 Sheets-Sheet 2

Charles H. Gagen,
Inventor,
By his Attorney Julian J. Wittal

Sept. 1, 1931.    C. H. GAGEN    1,821,211
DOUBLE PASSAGE FILTER AND CLOSURE FOR THE SAME
Filed June 20, 1928    3 Sheets-Sheet 3

CHARLES H. GAGEN,
Inventor,

By his Attorney Julian J. Wittal

Patented Sept. 1, 1931

1,821,211

UNITED STATES PATENT OFFICE

CHARLES H. GAGEN, OF NEW YORK, N. Y., ASSIGNOR, BY MESNE ASSIGNMENTS, TO AMERICAN AIR FILTER COMPANY, INC., OF LOUISVILLE, KENTUCKY, A CORPORATION OF DELAWARE

DOUBLE PASSAGE FILTER AND CLOSURE FOR THE SAME

Application filed June 20, 1928. Serial No. 286,771.

This invention relates to closure or sealing means for air filter units having baffles or the like arranged to form passages which are tortuous or obstructed in the direction of the air stream to be filtered but which are relatively free or unobstructed in another or different direction for cleaning the filtering surfaces of said units. The construction of a certain type of such units, best described in my two co-pending applications for Letters Patent No. 179,128, filed March 28, 1927, and No. 205,636, filed July 14, 1927, will be further explained in a brief general manner in the present specification when the occasion for the same arises.

One object of this invention is to provide a device which will quickly, easily and efficiently seal the bottom and top exits of said longitudinal cleaning passages when the units are in filtering operation and will be releasable in the same manner from said exit of said passages and from the units themselves when it is desired to remove the latter for cleaning.

Another object of this invention is to provide a device of the mentioned character which will operate in a mechanical and more or less automatic manner.

Still other objects of this invention are to provide a sealing device as characterized hereinbefore which is simple in operation, inexpensive to manufacture and which will be adapted to be used with various air filter constructions where units of the mentioned character may be employed.

The invention resides in the novel construction, combination and arrangement of parts hereinafter fully described, illustrated in the accompanying drawings, and as pointed out in the claims hereto appended.

In the drawings:

Figure 1 is a front elevation of a filter unit to which my invention is adapted to be applied, while Figures 2 and 3 are vertical and horizontal sections of the same taken on the lines 2—2 and 3—3 respectively of Figure 1, the scale of Figure 2 being somewhat enlarged as compared to that of Figure 1.

Figure 4 is a vertical sectional view of a portion of a filter frame structure with which a filter unit, shown in Figures 1 to 3 is adapted to be used, showing novel top and bottom elements to effect the sealing action when a unit is in place.

Figure 5 is a side elevation of a clip device employed to support in the filter frame my novel top sealing means while the filter unit is removed for cleaning.

Figures 6 and 7 are front and side elevations respectively of a complete filter frame with several units therein and illustrating a modified form of the top and bottom sealing means for such units with their operating mechanisms, while.

Figure 6:
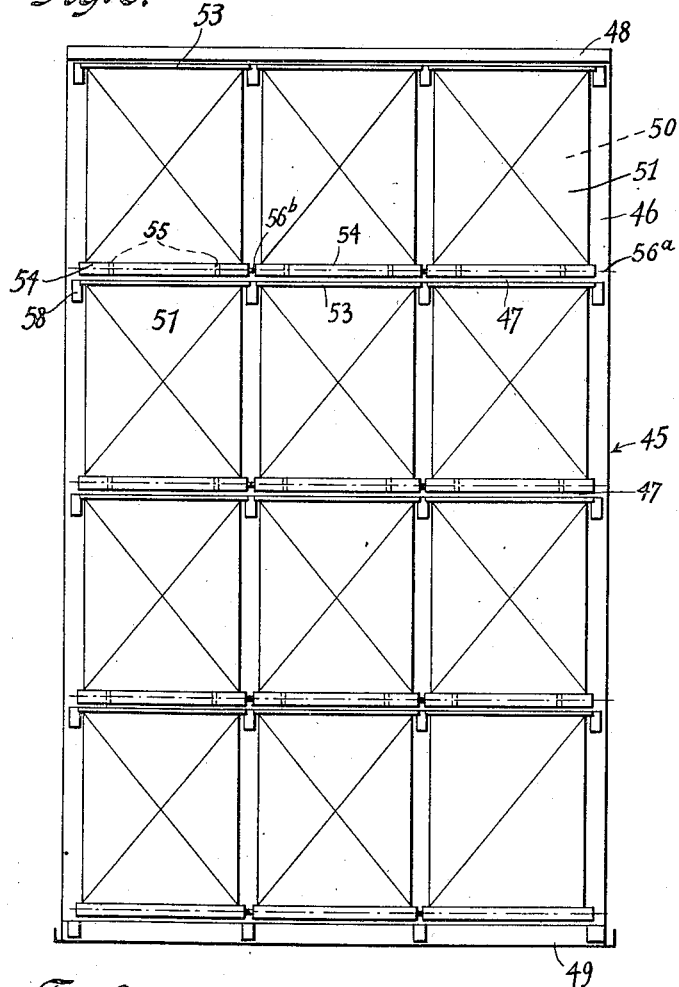

Referring now to the drawings by characters of reference, Figures 1 to 5 indicate one form of my sealing means and the character of the filter units and filter frame structures to which this form may be applied with advantage. In said figures the numeral 20 indicates in general a filter unit constructed substantially as described in my co-pending two applications referred to hereinabove and comprising the zig-zag bent filter plates 21 arranged between the two side frame plates 22 and 23 and the four vertical and horizontal frame angle irons 24 and 25 respectively. These plates will be coated with oil and the air to be filtered has to pass through the tortuous passages between them in the direction of the arrow 26, thereby depositing on them the impurities contained in the air. A front screen structure 27 and a rear screen structure 28 aid said filter plates in their filtering action, and in this form the filter unit 20 has an overhanging front frame 29 secured thereto with two conveniently placed manipulating handles or grips 30. The top 31 and the bottom 32 of the filter unit 20 are left open so that when said unit is removed from its operating and sealed position a cleansing fluid may be passed therethrough from the top 31 to the bottom 32 washing out the impurities from between the plates 21.

As will be seen this filter unit is constructed generally in a similar manner to the one described in my said co-pending applications, but it is intended and designed to be used in connection with certain types of filter frames having rectangular openings adapted to receive air filter units of other types used in the art and which are also designed to be removed from such frames from time to time for washing and cleaning said units.

In Figure 4 the numerals 33 and 34 indicate spaced horizontal members of such a filter frame while the numeral 35 indicates spaced vertical frame elements, said horizontal and vertical elements providing rectangular openings or recesses into which said units, commonly called cells, may be inserted, as will be more clearly indicated in Figure 6. In the form shown in Figure 4 horizontal frame elements 33 and 34 are oppositely placed U-shaped or channel irons and the air filter unit or cell 20 is placed in the rectangular opening or recess 36 between them and the vertical elements 35 by pushing it into the position indicated by the dotted lines 20' in Figure 4, the overhanging front frame 29 of the cell closely fitting on the flanges of the U irons to form a substantially air tight structure. As will be seen, in operation, air will pass through the filter cell in the direction of the arrow 26, but in case the top and bottom open ends 31 and 32 of the cell are not closed or sealed the air will seek the path of least resistance and pass by way of the open top and bottom instead of going through the tortuous channels between the filter plates 21. To remedy this condition I employ in the recess of the frame proper to receive the filter cells, top and bottom sealing means 37 and 38 which are pieces of U iron placed in the channels of the U irons 33 and 34 in a reversed position to the said irons. The lower sealing means 38 will rest on and within the lower horizontal frame member 34 and the filter unit 20 will rest on the top of said U iron 38 when placed in operative position within the filter frame. This arrangement closes the bottom exits 32 of the cell. The top exits 31 of the cell will be sealed by the upper U iron 37 which normally rests on the upper edges thereof.

When it is desired to remove the cell for cleansing the same, it will be pulled out of the recess 36, whereupon the upper U iron 37 will rest on the clips or supports 39 secured on the two side vertical frame elements 35, as at 40. The horizontal supporting arm 41 of clips 39 extends inwardly from the side frame wall 35 for a distance not greater than the clearance between the wall 35 and the adjacent side wall of the filter cell and is formed with a backward inclination so that the top sealing U iron 37 will rest in such a position when the cell 20 is removed from the recess in the frame structure that, as said cell is again pushed into operative position it will gradually raise said U iron 37 off the support 39, as will be understood.

Cell 20 is kept in its place in the frame in operative position preferably by frictional resistance or any suitable means may be employed for this purpose as is well known in the art. The overhanging frame 29 serves to keep the cell in the right position and also to seal the circumference of the same by being pushed against the respective units in the filter frame structure.

Figure 7:
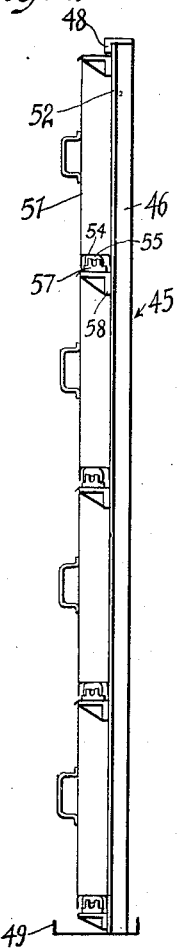
Figure 8:
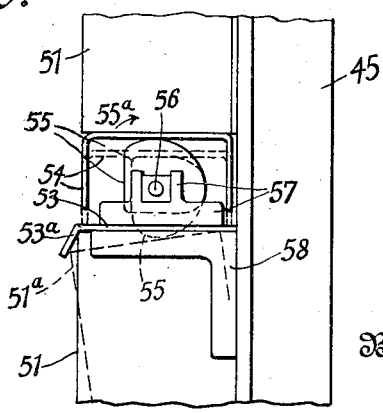
Figure 8 is an enlarged view of a portion of Figure 7 illustrating details of such means and operating mechanisms.

In Figures 6 to 8 I show a modified form of my filter cell sealing invention, and the first two of said figures show the general arrangement and construction of an air filter frame designed for said removable filter units or cells. The frame structure of the air filter is indicated in general by the numeral 45 and consists of the vertical members 46 and horizontal members 47, the said members being made of T irons. In the construction shown, the angel iron 48 forms the top member of the frame structure which rests on the bottom U iron or channel 49.

The horizontal and vertical frame members form rectangular cell receiving and air filtering openings 50, of which four rows of three each, are provided in the structure shown in Figure 6. Each such recess 50 will be closed by a cell or air filter unit 51, the same being placed against the flat front surface 52 of the frame structure overlapping to a certain distance the edges of the frame members around the recess 50 and having a similar construction to the filter units or cells hereinbefore referred to and partly described.

Along the top of each recess 50 is secured a cell top sealing plate or shelf 53 having a downwardly turned end 53a, as best shown in Figure 8. The bottom of each cell 51 will be closed by a U iron 54 placed along the bottom edge of each recess 50 and each resting on two cams 55 fast on a shaft 56. Each cell unit has an independent piece of shaft 56 placed along and in front of the lower edge of its recess in the filter frame, and journaled in bearings 57 resting on supports 58 secured on the front of the frame structure 45 at appropriate places. In the semi-diagrammatic showing of Figure 6 the center line of the individual pieces of shafts 56 is indicated by the dash and dot lines 56a, each shaft 56 carrying the two cams 55 for each unit or cell, while the bearings have been omitted in said figure. When it is desired to put a cell in place and to seal its top and bottom the same will be placed on the corresponding U iron 54 and the cams 55 turned into their positions shown in Figure 8 in full lines. The action of the cams will raise the U iron 54 and will press the same tight against the bottom of the cell 51 while the top of the same will be sealed by being pressed against the shelf or plate 53. Should the top of said cell be in a somewhat tilted position as indicated by the dotted lines 51a in Figure 8, the wedge action of the downwardly inclined front 53a of the shelf 53 will automatically guide the cell 51 into its position shown by full lines in Figure 8, where it is not only pressed against the shelf 53, but also against the front surface of the frame 45 thereby effectively sealing the two vertical edges of the recess 50. This action at the bottom of the cell 51 is assisted by the action of the cam 55 when it is turned into the raised or full line position as indicated by the arrow 55a since a friction will develop between the U iron 54 and the cam and will carry the U iron towards the frame while raising it, cell 51 participating in the said movements of the U iron (Figure 8).

When it is desired to remove a cell 51 for cleaning the same, shaft 56 of said cell and its cams 55 will be turned in a reversed direction thereby lowering the U iron 54 to disengage the cell from shelf 53 as indicated by the dotted lines in Figure 8. The cell 51 will then be released from between the shelf 53 and the U iron 54 and can be removed for cleaning. For turning the shafts their ends 56a may be made square or hexagonal and a key or wrench may be applied thereto so as to turn the shaft belonging to a certain cell 51 without disturbing other or adjacent shafts.

Figure 9:
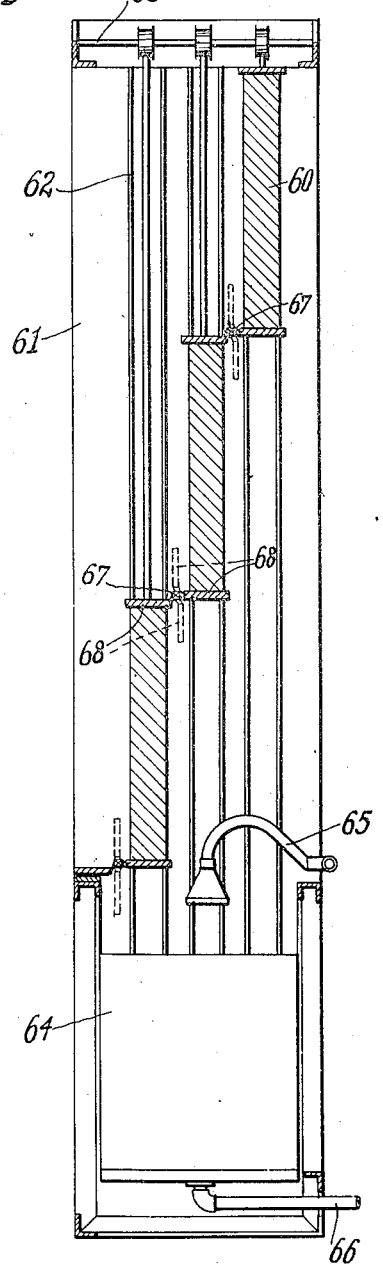
Figure 9 is a vertical sectional view of an air filter constructed according to the invention described in my co-pending application for air filters, Serial No. 205,636, and showing another modification of my improved top and bottom sealing means with the filter units therein.

In Figure 9 I illustrate sealing means for the bottoms and tops of my air filter units or cells of the mentioned character, said sealing means being especially designed for the type of air filters described and claimed in my co-pending application No. 179,128. In said filter the independent units or cells 60 are slidably mounted in vertical parallel unit guides 62 in a frame structure 61 each extending across the whole width of said frame structure and being suitably suspended as by means of pulleys on shaft 63. The bottom of said frame structure is in the form of a suitable oil tank 64 into which the cells may be lowered, cleaned and coated with oil and then again raised into their position as shown in Figure 9, as has been more fully described in my mentioned co-pending application. The numeral 65 indicates a pipe line for supplying the cleansing oil, while 66 is a pipe line to remove the used oil. In order to more effectively seal the top and bottom of each cell in such a construction of the filter frame, I provide a shaft 67, extending transversely across said frame at a position opposite the lower end of one cell and the upper end of an adjacent cell. The shaft is rotatable in said frame by any suitable means, as for instance by applying a key or wrench at one of its angular ends and carries two longitudinal plates 68 secured thereon and also bridging the whole width of the opening in the frame 61. When the cells of the filter units 60 are placed in their operative position shown in Figure 9 the plates 68 will be turned by the shaft 67 into the position shown by full lines in said figure and in which one plate will close the bottom of a cell 60 while the other plate 68 will close the top of the adjacent or lower cell 60. For better sealing effect the said plates 68 may be lined or surfaced with felt or other suitable material on their cell-engaging surfaces and they may be secured in pressing relation against the cells, as when shaft 67 is locked in such a position of said plates. When it is desired to lower the cell 60 shaft 67 will be given a quarter turn and the plates 68 placed in position as shown by dotted lines permitting the cell 60 to pass them when lowered or raised.

While I have shown my device in the preferred forms, it will be obvious that many changes and modifications may be made in the structure disclosed without departing from the spirit of the invention, defined in the following claims.

What I claim as new is:

1. In a filter the combination of a filter unit having its opposite ends open to permit passage of a cleansing medium therethrough during cleaning operation and in a direction at right angles to the normal direction of an air stream therethrough during filtering operation, and movable means for closing said open ends during normal air filtering operation.

2. In a filter the combination of a filter unit having open ends, movable plates positioned to engage said open ends and means for bringing said plates and said open ends into engagement to substantially prevent the passage of air through said ends during normal operation of the filter.

3. In a filter the combination of a frame, a filter unit mounted therein and having filtering elements arranged to present tortuous paths for an air stream passing therethrough from one side to the other and having opposite ends open to permit access of a cleansing medium to and across the filtering surfaces of said filtering elements in a direction at substantially right angles to the direction of the air stream, and movable means mounted in the frame to close said open ends.

4. In a filter the combination of a frame, a filter unit mounted therein and having an open end to permit access of a cleansing medium, and closure means adapted to be moved toward and away from said open end.

5. In a filter the combination of a frame, a filter unit therein having an open end, a closure member positioned to close said open end when the unit is in operative filtering position, and means for supporting said member in the frame.

6. In a filter the combination of a frame, a filter unit therein having an open end, a closure member positioned to close said open end when the unit is in operative filtering position, and a bracket in the frame positioned to support said member when the unit is removed.

7. In a filter the combination of a frame, a filter unit having an open end and adapted to be removably mounted in the frame, fixed means for engaging and covering said open end, and means for moving said unit toward said fixed means.

8. In a filter the combination of a frame, a filter unit having an open end and adapted to be removably mounted in the frame, fixed means for engaging and covering said open ends, means for moving said unit toward said fixed means, and a guide member adapted to deflect said unit toward said fixed means.

9. In a filter the combination of a frame having a unit receiving opening, a filtering unit adapted to engage portions of said frame adjacent to said opening to prevent passage of air between the frame and the unit, and means for supporting and moving said unit to and from operative position of engagement with said portions of the frame.

10. In a filter the combination of a frame, a filtering unit, a movable supporting member mounted on said frame, and means for actuating said member to move the unit into operative filtering position in relation to the frame.

11. In a filter the combination of a frame, a filtering unit having an open end, an end closing member on the frame, a unit supporting member on the frame, and means for actuating said member to move the unit into engagement with said end closing member.

12. In a filter the combination of a frame, a filtering unit having opposed open ends, a fixed end closing member, a movable end closing member, and means for actuating said movable closing member to move said unit into engagement with said fixed member.

13. In a filter the combination of a frame, a filter unit having an open end and slidably mounted in said frame, and means for closing said open end when the unit is in operative filtering position in the frame.

14. In a filter the combination of a frame, a filter unit having an open end and slidably mounted in said frame, means for closing said open end comprising a closure member movable to and from a position across the path of movement of said unit.

15. In a filter the combination of a frame, a plurality of filter units each having an open end, said units being mounted to move in substantially parallel planes and, when in operative filtering position, with an open end of one unit disposed adjacent the open end of an adjacent unit, and means for closing said open ends.

16. In a filter the combination of a frame, a plurality of filter units each having an open end, said units being mounted to move in substantially parallel planes and, when in operative filtering position, with an open end of one unit disposed adjacent the open end of an adjacent unit, and means for simultaneously closing said open ends.

17. In a filter the combination of a frame, a plurality of filter units each having an open end, said units being mounted to move in substantially parallel planes and, when in operative filtering position, with an open end of one unit disposed adjacent the opposite open end of an adjacent unit, and means for closing said open ends including a closure member movable out of the paths of said units to permit movement of the latter, and movable into the paths of the units to close said open ends.

18. In a filter the combination of a frame presenting a unit receiving opening, a unit having an open end and slidably mounted in said opening, a container for cleansing liquid or the like positioned to receive said unit, and closure means having one portion positioned to engage said open end of the unit and another portion positioned to engage said frame to prevent flow of air between said frame and the unit when the latter is in operative filtering position.

Signed at New York, in the county of New York, and State of New York, this 13th day of June, A. D. 1928.

CHARLES H. GAGEN.